United States Patent [19]

Huang et al.

[11] Patent Number: 5,650,230
[45] Date of Patent: Jul. 22, 1997

[54] COMPRESSIVE STRUT FOR CRYOGENIC APPLICATIONS

[75] Inventors: Xianrui Huang, Lynchburg, Va.; Mostafa M. Abdelsalam, Madison, Wis.

[73] Assignee: Wisconsin Alumni Research Foundation, Madison, Wis.

[21] Appl. No.: 5,251

[22] Filed: Jan. 15, 1993

[51] Int. Cl.$^6$ .................................................. D02G 3/00
[52] U.S. Cl. ...................... 428/372; 428/364; 428/586; 74/579; 403/368
[58] Field of Search .................. 428/372, 586, 428/36.1, 245; 74/579, 581; 267/69, 70; 403/11, 368, 320

[56] References Cited

U.S. PATENT DOCUMENTS

| | | | |
|---|---|---|---|
| 3,708,248 | 1/1973 | Haldeman, III | 417/48 |
| 3,771,810 | 11/1973 | Barnett | 280/63 |
| 3,805,367 | 4/1974 | Hasty | 29/448 |
| 3,832,567 | 8/1974 | Anderson et al. | 307/110 |
| 3,889,788 | 6/1975 | Littler et al. | 191/40 |
| 3,979,164 | 9/1976 | Kuchnir . | |
| 3,980,981 | 9/1976 | Boom et al. . | |
| 4,070,423 | 1/1978 | Pierce | 261/77 |
| 4,122,512 | 10/1978 | Peterson et al. . | |
| 4,262,863 | 4/1981 | Slusarczyk | 244/13 |
| 4,278,229 | 7/1981 | Burlett | 249/11 |
| 4,290,511 | 9/1981 | Baau et al. | 188/322 |
| 4,555,096 | 11/1985 | Pryor | 267/8 |
| 4,589,236 | 5/1986 | McAllister | 52/81 |
| 4,622,531 | 11/1986 | Eyssa et al. . | |
| 4,669,367 | 6/1987 | Tanaka et al. | 92/227 |
| 4,771,256 | 9/1988 | Laskaris et al. | 335/301 |
| 4,800,354 | 1/1989 | Laskaris | 335/216 |
| 4,848,103 | 7/1989 | Pelc et al. | 62/51.1 |
| 4,895,351 | 1/1990 | Devaud | 267/69 |
| 4,992,313 | 2/1991 | Shobert et al. | 428/36.1 |
| 5,115,219 | 5/1992 | Withers et al. . | |
| 5,284,011 | 2/1994 | Von Benken | 60/39.31 |
| 5,315,277 | 5/1994 | Eyass et al. | 335/216 |

*Primary Examiner*—Merrick Dixon
*Attorney, Agent, or Firm*—Foley & Lardner

[57] ABSTRACT

A compressive strut for cryogenic applications includes a tube with a cylindrical bore wall defining an internal cavity, a rod of filling material within the cavity which has low thermal conductivity, and structure in engagement with the rod, such as end plugs partially inserted into the ends of the tube and in contact with the rod. The tube may be formed of a composite material such as fiberglass within a matrix of epoxy, wherein the fiberglass fibers are wound circumferentially. The plug at one end of the strut is attached to the warm support structure and the plug at the other end is attached to the cold structure, such as a superconducting magnet which is maintained at cryogenic temperatures. Compressive pressure applied by the magnet to the strut causes the plugs to press inwardly on the filling material rod, expanding the rod radially. The circumferentially strong tube resists outward expansion of the rod and carries a significant portion of the compressive pressure applied to the rod so that the rod itself does not have to support the compressive forces applied to it. Consequently, the rod can be formed of a relatively low thermal conductivity material which need not have high strength, and the tube need only have high strength in the circumferential direction.

32 Claims, 6 Drawing Sheets

COMPRESSIVE STRUT FOR CRYOGENIC APPLICATIONS

FIELD OF THE INVENTION

This invention relates generally to the field of superconductive magnetic energy storage (SMES) systems, superconducting supercollider (SSC) systems, cryogenic storage Dewars, and the like, and particularly to support structures used in these systems.

BACKGROUND OF THE INVENTION

Energy storage systems using large superconducting magnets have been proposed for leveling daily load requirements on electrical utility systems. Excess energy generated during off-peak hours can be stored and later returned to the power grid during high demand periods. By connecting the superconducting energy storage magnet to the power system with a bridge-type inverter, it is possible to obtain very efficient energy transfer between the storage magnet and the power system, as more fully described in U.S. Pat. No. 4,122,512 to Peterson, et al.

The large energy storage magnets proposed for storing sufficient energy to allow load leveling on a power grid utilize multiple turns of composite conductor formed of normal and superconducting material. The current flowing in the turns of the magnet naturally produces a net magnetic field, and any conductor in the field will experience a force at each point on the conductor oriented at right angles to the current and the magnetic field. Since superconducting magnets of the size proposed for electrical system energy storage will conduct extremely large currents and will generate strong magnetic fields, the forces experienced by the conductors will be very large. Since no conductor by itself could possibly withstand the forces that would be exerted on the conductor under these conditions, an external support structure capable of resisting the large loads imposed on the conductor is thus necessary.

However, substantial practical difficulties are encountered in supporting the superconducting magnet because of the supercooled conditions under which the magnets must be operated. For example, the support structure must not add a significant thermal load on the cooling system. Generally, the magnet is coupled to a warm structure, such as bedrock, by struts. The bedrock is at normal ambient temperatures (e.g., 50° to 70° F.). The magnet, however, is operated in a Dewar which thermally isolates the magnet for operation at cryogenic temperatures (e.g., 1.8–7K). Although the Dewar which encases the magnet provides some thermal insulation, significant heat transfer from the magnet to the warm structure occurs through the struts, which must pass through the walls of the Dewar. These struts are often the major source of refrigeration load for the system. Although it is desirable that the struts minimize heat conductivity, they must be strong enough to provide adequate structural support for the system and to transfer the very large magnetic forces from the magnet to the warm structure. In addition, struts are also needed to support the weight of the magnet.

High strength cryogenic strut designs have generally reinforced the strut in the axial direction, commonly with fibers oriented in or close to the axial direction. Reinforcement of the struts in this manner leads to increased thermal conductivity in the axial direction since the fibers extend in substantially a direct line, and thus provide a short thermal resistance path, from the cold magnet to the warm support structure. The thermal conductivity of reinforcement fibers is generally higher than that of the matrix resin.

One approach to the problem of adequately supporting a superconducting energy storage magnet is shown in U.S. Pat. No. 5,115,219 to Withers et al. This system relies on an adjustable external strut system and a vertical support system which accommodates the large radial movements of the magnet. The struts have a tubular body coupled to an insulating disk which retards heat transfer. The strut has a radial linear end with a ball which nests in a socket secured to a vertical interface plate.

A further approach is described in U.S. Pat. No. 3,980,981 issued to Boom et al. on Sep. 14, 1976. The struts or support columns include support members which criss-cross and intersect to provide stability. Further, the columns include lateral members between adjacent columns for providing structural stability. The columns are made from an epoxy-fiberglass composite.

Efforts to improve designs for a thermally insulated load bearing strut for use in such applications as superconductive magnetic energy storage (SMES) systems, superconducting supercollider (SSC) systems, and cryogenic storage Dewars have generally followed one of three approaches. The first is to design the struts with new materials which have superior support strength and superior thermal resistance. The second involves intercepting and removing the heat from the struts more efficiently. The third involves innovative but complex support designs.

The first approach generally relies on nonmetallic composites. Research on new composites with higher strength to thermal conductivity ratios has been in progress for a long time. An example is the Altex (TM) alumina fiber reinforced epoxy manufactured by Sumitomo Chemicals in Japan. However, these new advanced composites are usually more expensive than the widely used glass fiber-epoxy struts.

The second approach—intercepting and removing heat more efficiently—often relies on increasing the length of the heat path. However, this is disadvantageous because structural deficiencies are introduced due to buckling constraints, and the increased length increases costs associated with the size of the warm structure and the struts.

The third approach—utilizing innovative designs—has resulted in designs which transfer the forces from cold to warm structure by tension straps. Tension straps have been successful for cold structure suspended inside warm structures, as in a storage Dewar. Another innovative design utilizes a re-entrant strut which includes an elaborate sequence of coaxial tension-compression members to increase the heat path length without increasing the overall strut length. Re-entrant struts are complex to manufacture and require more material. Because of manufacturing complexity, the re-entrant strut has been used only for small loads.

SUMMARY OF THE INVENTION

In accordance with the present invention, an efficient strut for cryogenic use is preferably constructed of a tube, a rod within the tube, and means for engaging the ends of the rod such as first and second piston-like plugs slidably mounted within the tube. The first plug is coupled to the warm support structure and the second plug is coupled to the cold structure such as a superconducting magnet. The cavity of the tube is filled with the rod formed of a filling material which is solid at cryogenic temperatures, and the tube preferably is a composite which has high strength and high modulus fibers disposed in a circumferential direction for sustaining radial pressures within the tube. Forces applied to the first and second plugs move the plugs with respect to the tube so that the rod of filling material carries part of the stress from the forces as strain within the solid filling material, and partially transfers the stresses to the tube by applying radial pressure on the tube. The filling material is particularly chosen to have low thermal conductivity, preferably significantly lower than the tube. However, the cross-sectional area of the tube can be much less than that of the rod, thereby minimizing total heat flow through the strut. In addition, the tube is preferably reinforced with circumferential fibers, rather than axial fibers, thereby causing the axial heat flow through the tube to be less than in conventional tube struts. Thus, the strut combines high thermal resistivity with adequate strength for supporting the magnet.

The strut may also be circumferentially reinforced by discontinuous circumferential hoops or rings which are tightly engaged about the tube. These hoops may be made of high strength and high modulus material which also has relatively high heat conductivity, such as stainless steel, because the axially spaced hoops do not provide an axial heat flow path from warm structure to cold structure.

Further objects, features and advantages of the invention will be apparent from the following detailed description when taken in conjunction with the accompanying drawings.

DETAILED DESCRIPTION OF THE INVENTION

Figure 1:
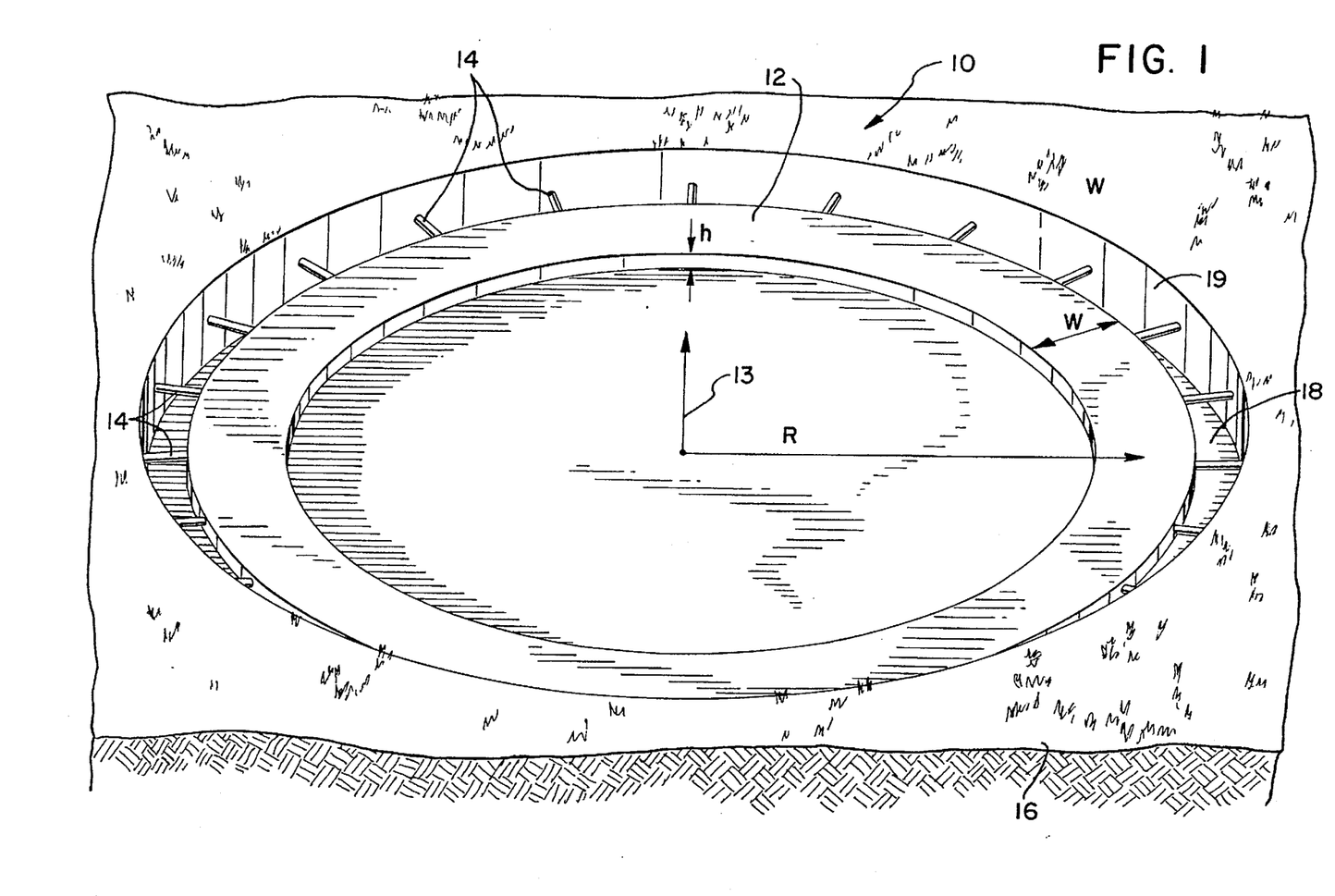
FIG. 1 is a schematic perspective view of an exemplary layout of an energy storage magnet which illustrates the use of the strut of the present invention.

To illustrate the use of the present invention, a large scale energy storage magnet system 10 is shown in FIG. 1 constructed in a cylindrical trench 18 excavated from a warm structure such as solid earth or bedrock 16. The system 10 includes a magnet 12 coupled to a peripheral wall 19 of the trench in the bedrock 16 by struts 14 in accordance with the invention which provide support for resisting radial outward forces on the magnet. The magnet 12 has a radius R, as measured from a central axis 13, which may be in the range of several hundred meters for a large scale energy storage system, and the trench 18 is typically several meters wide and deep. The trench may be constructed as a tunnel. The magnet 12 is electrically coupled to a power plant (not shown) and a transmission grid (not shown). This coupling may be accomplished, for example, as described in U.S. Pat. No. 4,122,512. In accordance with conventional practice, the magnet 12 is preferably constrained in a liquid helium vessel (not shown) which is itself surrounded by a vacuum vessel or Dewar (not shown separately from the magnet 12). A liquid helium bath at or below about 4K is required for typical low temperature superconductors such as niobium-titanium and niobium-tin. Of course, other cryogenic coolants may be used as appropriate for higher temperature superconductors. The radial magnetic forces on the magnet 12 are transferred by the struts 14 to the warm structure 16 (e.g., bedrock) at the wall 19 of the trench 18, which may be lined with concrete. The struts 14 connect to the support wall 19. The large net force on the magnet 12 will be directed radially outward through the struts 14 to the peripheral wall 19 of the trench 18. The smaller gravity load from the weight of the magnet, Dewar, and ancillary equipment may be supported by smaller vertical struts (not shown in FIG. 1) which may also be formed in accordance with the present invention.

The struts 14 of the present invention are particularly suited to support a superconducting energy storage magnet 12 as described above since they are capable of carrying large compressive stresses at cryogenic temperatures and yet have a low thermal conductivity. Low thermal conductivity is particularly important in such applications since the struts 14 extend directly from the warm support structure through Dewars or other insulation to attachment to the magnet structure which must be maintained at cryogenic temperatures near absolute zero. Of course, the struts of the present invention may also be utilized in other applications where such properties are desirable, such as in the support of superconducting magnets for particle accelerators, or, generally, the support of any structure (e.g., to support its weight) which must be maintained at cryogenic temperatures.

Figure 2:
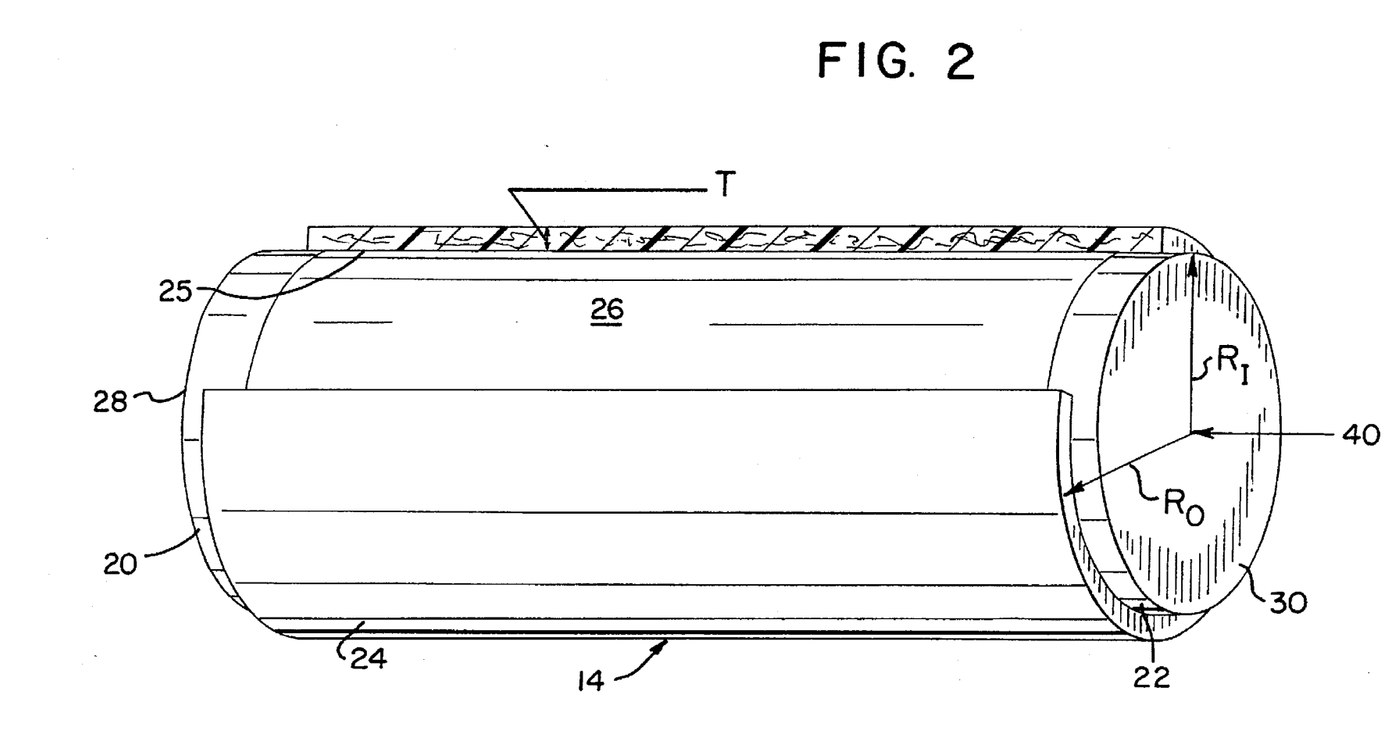
FIG. 2 is a perspective view of the strut partially broken away to illustrate the filling material within the tube of the strut.

With reference to FIG. 2, the strut 14 is shown in more detail in accordance with the preferred exemplary embodiment of the present invention. The strut 14 is designed to absorb compressive loads such as between the magnet 12 and the bedrock 16. The strut 14 can be connected to the magnet at one end 22 of the magnet, and to the bedrock 16 on its other end 20.

The strut 14 includes a cylindrical hollow tube 24, a rod of filling material 26 within the bore of the tube, an end plug 28 and an end plug 30. The tube 24 preferably has very high circumferential tensile strength and modulus, but need not have significant axial compressive stength. The tube 24 has a cylindrical internal bore wall 25 with a radius $R_i$, an outer radius $R_o$ and a thickness T. The bore wall 25 defines a cylindrical internal cavity of the tube, and the tube 24 is generally symmetrically with respect to an axis through the center of the tube (herein, the central axis). As used herein, the axial direction is parallel to the central axis, and the radial direction is perpendicular thereto.

Preferably, the tube is made of a fiber reinforced composite, such as glass fiber in an epoxy matrix, with the fibers arranged circumferentially, a structure having very high tensile strength and modulus in the circumferential direction and very low thermal conductivity in the axial direction. The alignment of the reinforcement fibers in the circumferential direction increases the hoop strength of the tube 24 greatly without significantly increasing the axial thermal conductivity of the tube since heat conduction between turns of fiber through the matrix in which the fibers are embedded, e.g., the epoxy which binds the glass fibers, is relatively low if the thermal conductivity of the binder is low, as is the case for conventional cryogenic epoxies. Thus, the axial heat conductivity is relatively low even if the conductivity of the fibers is high. The circumferential reinforcement fibers may also be wound in a helical fashion. A convenient manner of forming the tube 24 is to use epoxy wetted prepreg tape which is wound around a mandrel, after which the epoxy is cured to form the solid tube 24. Another alternative is to encase fiber windings in liquid epoxy which is hardened to form a solid tube. Of course, other high strength fibers, such as boron, carbon, etc. may be used, as well as steel wire in appropriate cases.

Another manner of forming the tube is to preform a cylindrical filling rod and then wind the prepreg tape or fibers using the filling rod as a mandrel, with separate extensions of the rod used for mandrels over the regions to be occupied by the end plugs. Where fibers are wound around the filling material, liquid epoxy is then applied around the wound fibers and cured to form the tube. Forming the tube in this manner provides a tight engagement of the tube to the filling rod. If the rod and tube are formed separately, it is desirable that they be formed to precise dimensions with close tolerances. As another alternative, the tube may be formed first and the filling material poured into the tube as a liquid which hardens, as by curing, to form the solid filling material rod. Some axially aligned fibers may also be embedded in the matrix material of the tube, if desired, to provide some axial stiffening. A fiber mesh wound in layers thus may be used for the reinforcement fiber rather than individually wound fibers.

The end plug 28 is slidably mounted on the warm side 20 of the tube 24 partially into the tube, and the end plug 30 is slidably mounted on the cold side 22 partially into the tube 24. The piston-like plugs 28 and 30 are preferably comprised of a metal, e.g., aluminum, but in appropriate cases may also be formed of a composite.

The end plugs provide a strong and non-brittle structure which can be readily connected to the hot and cold structures using convenient connectors, which may also be metal. Where appropriate, one end or both ends of the tube may be open and the rod within directly engaged by warm or cold support structure which has a plug structure formed thereon, or one end of the tube may be entirely closed off with a plug engaged only at the other end.

The cavity of the tube 24 is substantially filled with the rod 26, as illustratively shown in the exposed region of FIG. 2, and this material forms a solid rod within the cavity of the tube. The rod of filling material 26 preferably has a lower modulus than the modulus of the tube 24 and a relatively high Poisson's ratio. The filling material rod 26 may be, for example, a conventional epoxy for cryogenic use which has a very low thermal conductivity. The filling material is a solid at cryogenic temperature and preferably is a solid at room temperature since the strut 14 will be connected to room temperature support structure. The filling material should not become excessively brittle at cryogenic temperatures. Another generally suitable filling material is a polyester resin. A lubricating material, such as a wax film, may be applied between the bore wall 25 of the tube 24 and the filling material rod 26 to ensure that no axial load is transferred to the tube. For the same reason, the outside diameter of the rod 26 may be slightly less than the inside diameter of the tube when no compressive load is applied, although generally it is desirable that the surface of the rod 26 be in firm contact with the bore wall 25 so that the rod is not strained excessively before the tube begins to carry the stress imposed on the rod.

Figure 3:
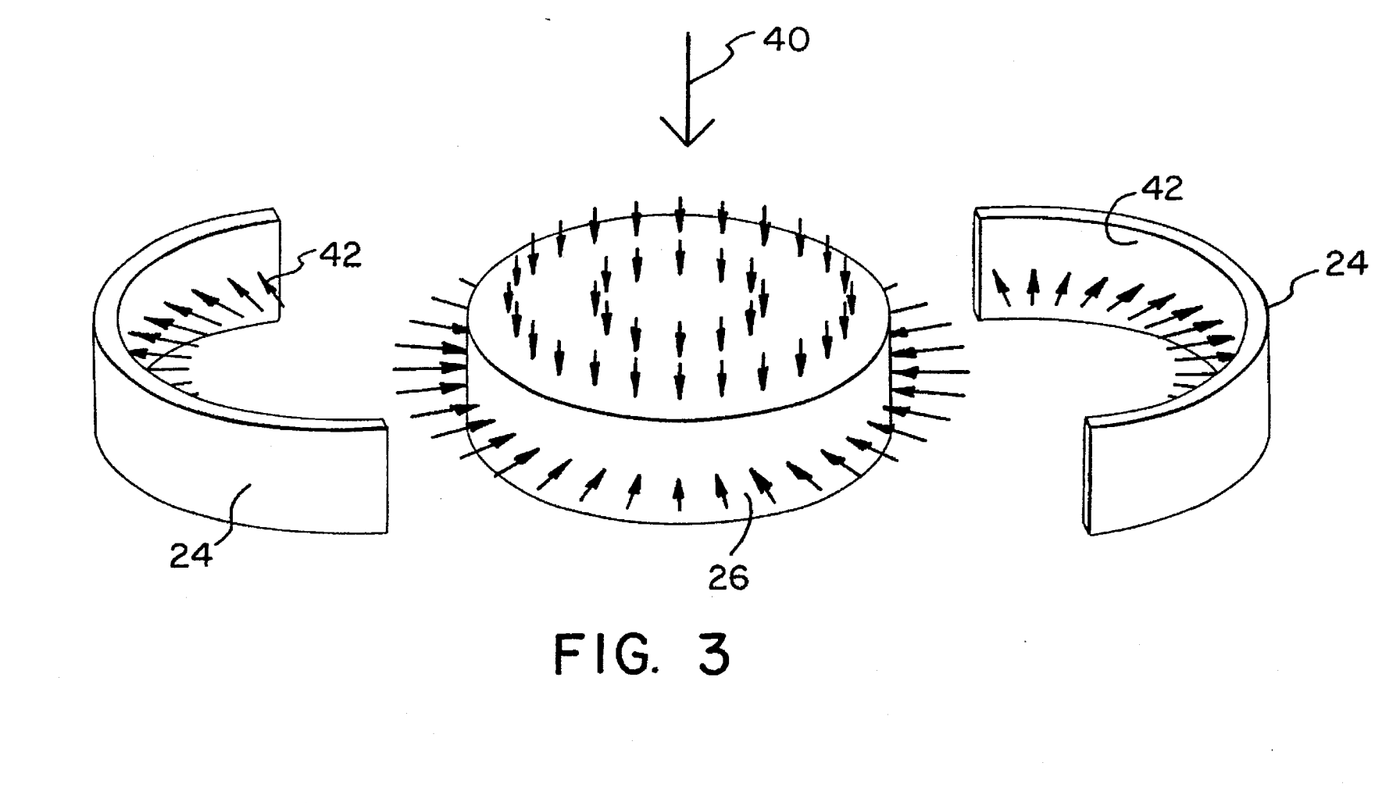
FIG. 3 is an illustrative view showing the distribution of forces within the strut.

As a compressive force 40 is applied from the magnet 12 to the cold end 22 of the strut 14, the end plug 30 slides into the tube 14 to compress the rod 26 of the filling material. As the rod 26 is compressed, the strain in the rod results in an expansion of the rod outwardly, and this expansion is resisted by the tube 24, which generally has a much higher Young's modulus in the circumferential direction than the modulus of the rod. FIG. 3 illustrates the manner in which the axial stress on the filling material rod is partially transferred to a radial pressure 42 on the tube 24. For a tube 24 having circumferential reinforcing fibers, the circumferential stress is carried primarily by the circumferentially aligned fibers within the tube 24. A tube structure having circumferential reinforcement fibers is generally capable of withstanding much greater hoop stresses than a tube formed of a single solid of comparable size and weight. It is desirable to minimize the size of the tube (i.e., its cross-sectional area) since the rate of axial heat conduction in the tube will generally be proportional to the cross-sectional area of the tube. With this arrangement, the rod of filling material 26 can carry the compressive load applied to it provided that the tube 24 withstands the pressure required to confine the radial expansion of the filling material rod 26. This design is extremely advantageous because the thermal conductivity of the filling material 26 forming the rod can be extremely low in comparison with a solid strut of structural material of the type which would be capable of carrying the axial compressive stress entirely by its own strain.

With most of the fibers lying in the circumferential direction in the tube 24, the strength and thermal conductivity of the tube in the circumferential direction generally are both much higher than the strength and thermal conductivity in the axial direction. The relatively high circumferential thermal conductivity and the relatively low axial strength of the tube 24 have no effect on the performance of the strut 14 because substantially no axial stress need be imposed on the tube, and at any axial position along the strut all points on the circumference of the tube should be at the same temperature. Further, the absence of axial stress on the tube 24 avoids brooming of the end of the tube, local bending, and stress concentration at the ends of the tube 24. These problems often cause premature failure in a conventional strut which is formed of an epoxy-fiber composite. Further, the design in accordance with the present invention is advantageous because the strut 14 has only one primary failure mode, failure in tension of the circumferential fibers, as opposed to the multiple failure modes of conventional struts. Further, more complex and expensive end caps which are often used to prevent brooming in the conventional strut are no longer required since the metal plugs 28 and 30 are well suited to be connected directly to metal structures or other hard materials or even to be integrally formed with the structures at the ends.

As an example of the strut of the invention, a strut was formed of a composite tube reinforced by a woven glass fiber cloth (about 50% circumferential and 50% axial fibers) in a cryogenic epoxy, 0.75 inch in inner diameter, 1.0 inch in outer diameter, and a length of 1.5 inches, with a filling material rod of polyester resin 1.0 inch long and outer diameter of about 0.75 inch. The end plugs 28 and 30 were formed of aluminum cylinders 0.5 inch long having an outer diameter of 0.75 inch. Tests on this strut showed that the strut withstood a compressive force of three times that which could have been withstood by a polyester rod of comparable cross-section by itself. Failure occurred by rupture of the circumferential or hoop fibers without failure of the axial fibers.

The calculated thermal efficiencies for a strut in accordance with the invention are shown in Table I below for various "alpha" values. The thermal efficiency of a conventional epoxy fiber glass strut is also shown under the heading ETM. Alpha ($\alpha$) is the ratio of the thickness T over the inner radius $R_i$ of the tube 24. The filling material rod is an epoxy having the following properties: Young's modulus of 2.4 GPa; Poisson's ratio of 0.35, and a thermal conductivity of 0.06 W/m·K. The tube is a glass-fiber/epoxy composite, with the glass fiber helically wound, having the following properties: Young's modulus in the circumferential direction of 39.4 GPa; an ultimate strength in the circumferential direction of approximately 969 MPa; an axial thermal conductivity of 0.10 W/m·K; and a circumferential conductivity of 0.48 W/m·K. The tube thus has a much higher modulus in the circumferential direction than the modulus of the filling material rod, so that the tube will not expand much under pressure as compared to the filling rod and the stress imposed on the rod will be largely transferred to the tube.

The efficiency $$\left(\frac{Nk}{Wm}\right)$$

of the strut is calculated for the foregoing materials in accordance with the following expression:

$$\text{Efficiency} = \frac{775.2 + 8272.03\alpha}{0.8274 + 2.758\alpha + 1.379\alpha^2} \times 10^6 \left(\frac{Nk}{Wm}\right)$$

TABLE I

| α | 0.25 | .2 | 0.15 | 0.10 | 0.05 | ETM |
|---|------|-----|------|------|------|-----|
| Efficiency | $1.77 \times 10^9$ | $1.69 \times 10^9$ | $1.58 \times 10^9$ | $1.43 \times 10^9$ | $1.23 \times 10^9$ | $3.45 \times 10^8$ |

Table I shows that the strut design in accordance with the present invention reduces the strut heat load by a factor of four to five from conventional strut designs.

Figure 4:
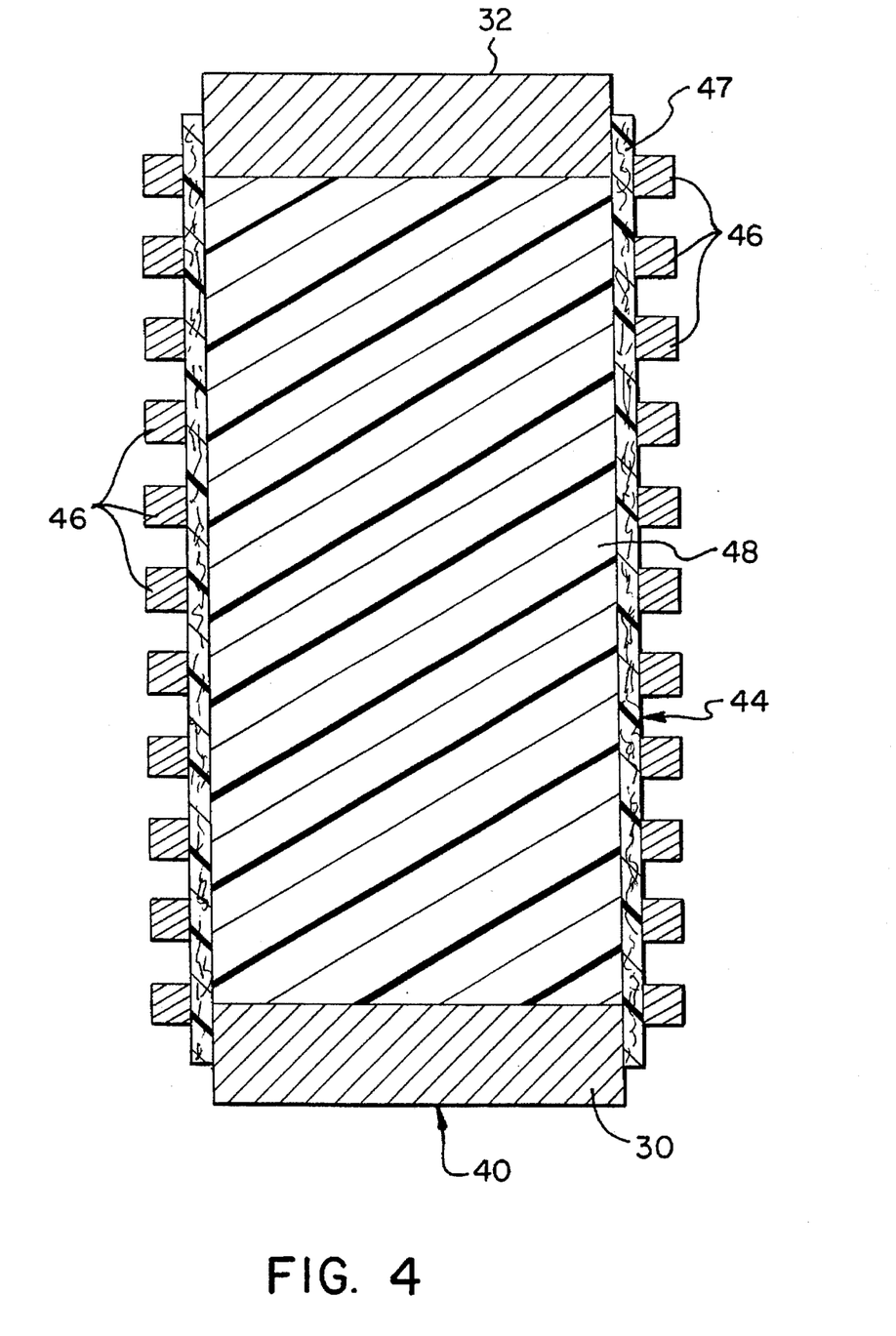
FIG. 4 is an axial cross-sectional view of a strut in accordance with the invention.

With reference to FIG. 4, a strut 44 in accordance with a modified embodiment of the invention is shown in axial cross-section. The strut 44 is generally similar to the strut 14 of FIG. 2 but additionally includes a plurality of hoops or tension rings 46 engaged around the tube 47 of the strut 44. The tension rings 46 stiffen the tube 47 to restrain radial expansion of the tube. The tube 47 of the strut 44 may have fiber reinforcements in both the vertical and circumferential directions and may be thinner than the tube 24 of the strut 14 since the rings 46 carry much of the radial pressure. The rings 46 may be comprised of various high tensile strength materials, such as metal or composite materials with reinforcement (e.g., glass fibers) in the circumferential direction. When the load 40 is applied to the strut 44, the filling material rod 48 within the tube 47 expands to apply pressure to the tube 47 and the rings 46. In this construction, the tube 47 does not need to be able to carry all the circumferential stress applied to it, and thus may be thinner than the tube 24 with correspondingly lower axial heat conduction. The rings 46 do not significantly contribute to heat conduction because they are spaced axially from one another and thus do not provide a continuous axial heat flow path.

Figure 5:
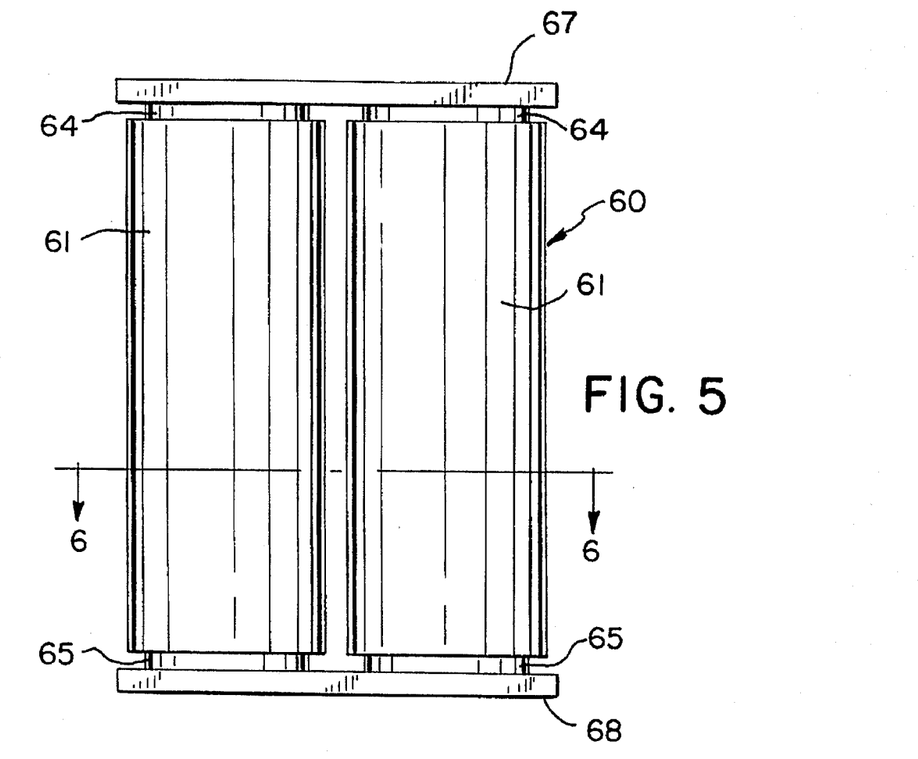
FIG. 5 is an elevational view of a strut structure comprised of four struts mounted together as a unit.
Figure 6:
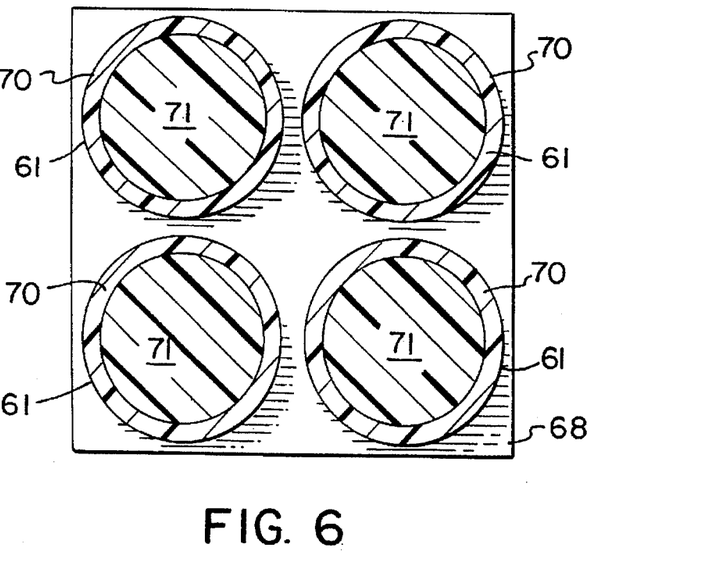
FIG. 6 is a cross-sectional view of the strut unit of FIG. 5 taken generally along the lines 6—6 of FIG. 5.

With reference to FIG. 5 and 6, a strut unit 60 is shown which includes four struts 61 which may be similar in construction to the struts 14 or 44 described above. End plugs 64 and 65 at the tops and bottoms, respectively, of each strut 61 are engaged to a top plate 67 or a bottom plate 68, respectively. Each strut 61 includes a tube 70 and a filling material rod 71 which may be formed as described above with respect to the struts 14 and 44. Pressure on the end plates 67 and 68 is transferred to the struts 61. The end plates 67 and 68 balance the loads across the end plugs 67 and 68. The plates 67 and 68 may be comprised of metal to provide a firm mounting to warm and cold structure. The strut unit 60 has greater load capacity and tolerance for load eccentricity than a single strut. The strut unit 60 could also include fewer or more than the four struts shown in FIGS. 5 and 6.

Figure 7:
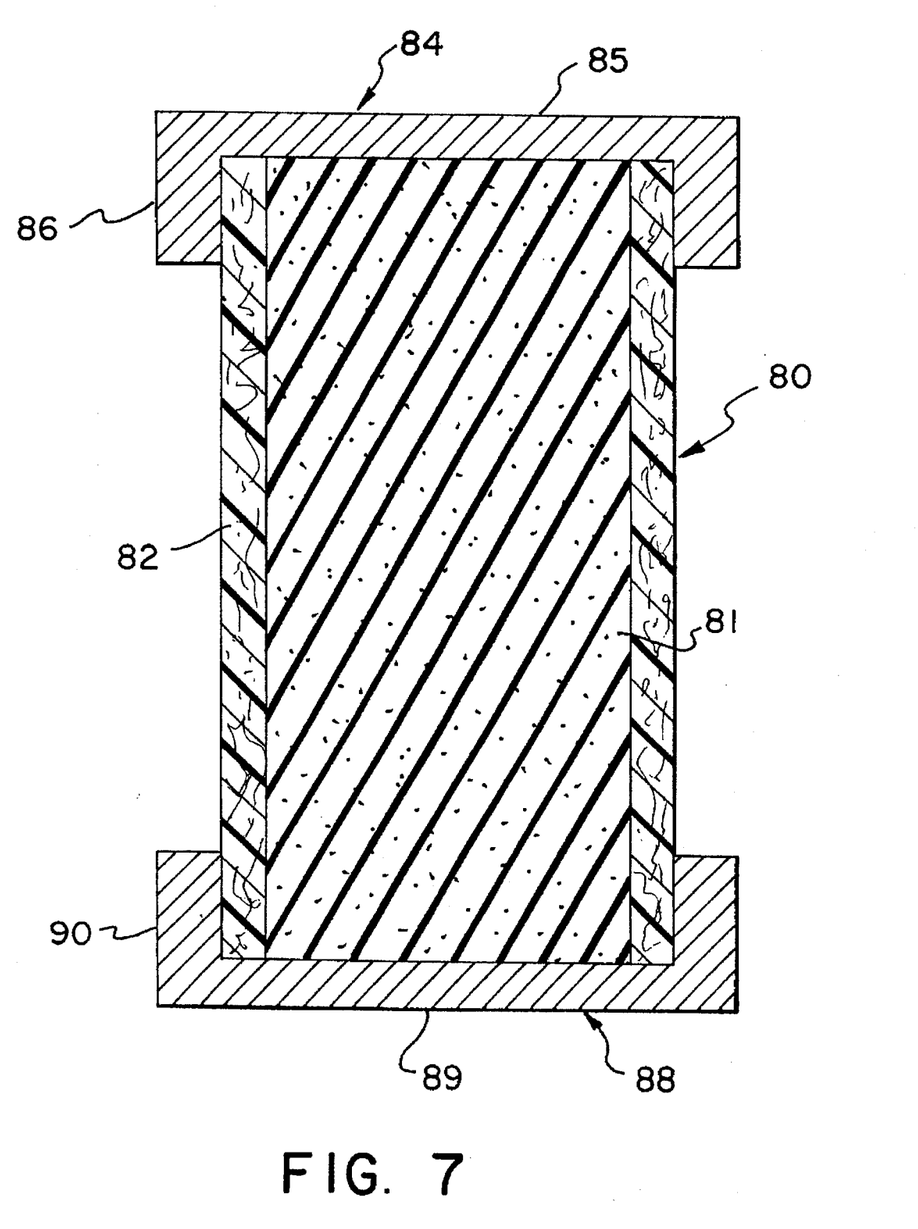
FIG. 7 is a cross-sectional view of a strut in accordance with the invention.

For some applications, the strut of the present invention may be utilized in a form which does not have end plugs which fit inside the tube. An exemplary structure is the strut 80 of FIG. 7, which has a filling material rod 81 engaged within the bore of a tube 82, each of which may be formed as described above. However, the strut 80 has a first end cap 84 which has a flat center plate 85 and a cylindrical skirt 86 extending therefrom, and a second end cap 87 having a flat center plate 88 and a cylindrical skirt 90 extending therefrom. The inner sides of the center plates 88 and 89 are engage the ends of the rod 81 and tube 82, while the inner sides of the cylindrical skirts 86 and 90 are in close fitting engagement with the outer side of the tube 82. As compressive forces are applied to the end caps 84 and 88, these forces primarily are transmitted as compressive forces on the rod 81 as the end caps engage the rod, which transfers the stresses to tension in the tube 82 in the manner described above. Although some compressive stress will be imposed on the tube 81, the relatively thin walled tube will tend to give under this stress, resulting in a thickening of the tube and/or a slight bulging of the tube outwardly in its midsection, with most of the compressive stress thus being transferred to the rod 81 from the end caps. This transfer is facilitated if the tube is somewhat flexible in the axial direction. The skirts 86 and 90 hold the tube in place with respect to the end caps, and may help to avoid brooming of the ends of the tube, although the skirts may be eliminated or modified in appropriate cases.

It is understood that the invention is not confined to the particular construction and arrangement of parts described herein, but embraces such modified forms thereof as come within the scope of the following claims.

What is claimed is:

1. A strut for use in cryogenic support applications comprising:
   (a) a cylindrical tube having a cylindrical internal bore wall defining a cavity about a central axis;
   (b) a rod of filling material which is solid at cryogenic temperatures disposed within the cavity of the tube to engage the internal bore wall and having a low thermal conductivity, wherein the tube has a Young's modulus in the circumferential direction higher than the Young's modulus of the filling material so that as the rod is compressed, the strain in the rod results in the expansion of the rod outwardly, which expansion is resisted by the tube;
   (c) a first plug slidably mounted partially into the cavity at a first end of the tube and engaged with the rod; and
   (d) a second plug slidably mounted partially into the cavity at a second end of the tube and engaged with the rod, wherein the plugs move inwardly into the tube as axial compressive pressure is applied to the plugs so that the axial forces are partially applied as radial pressure to the tube by the rod of filling material as the rod expands radially under the compressive stress applied to it.

2. The strut of claim 1 wherein the filling material has a relatively low Young's modulus and a relatively high Poisson's ratio.

3. The strut of claim 1 wherein the tube is comprised of a composite material having fibers embedded in a solid matrix material, the fibers being disposed circumferentially about the axis.

4. The strut of claim 3 wherein the tube is formed of a composite of glass fiber in an epoxy matrix.

5. The strut of claim 1 wherein the plugs are formed of aluminum.

6. The strut of claim 1 wherein the tube is a composite of fibers in a solid matrix, some of the fibers oriented in an axial direction and some oriented in a circumferential direction.

7. The strut of claim 1 further including a plurality of stiffening rings engaged around the outside of the tube, the rings being axially separated from each other.

8. The strut of claim 7 wherein the stiffening rings are comprised of a glass fiber composite or metal.

9. The strut of claim 1 further including a lubricant between the rod and the bore wall of the tube to facilitate sliding of the rod with respect to the tube.

10. A strut unit for use in cryogenic support applications comprising:
(a) a plurality of struts, each strut comprising:
(1) a cylindrical tube having a cylindrical internal bore wall defining a cavity about a central axis;
(2) a rod of filling material which is solid at cryogenic temperatures disposed within the cavity of the tube to engage the internal bore wall and having a low thermal conductivity, wherein the tube has a Young's modulus in the circumferential direction higher than the Young's modulus of the filling material so that as the rod is compressed, the strain in the rod results in the expansion of the rod outwardly, which expansion is resisted by the tube;
(3) a first plug slidably mounted partially into the cavity at a first end of the tube and engaged with the rod; and
(4) a second plug slidably mounted partially into the cavity at a second end of the tube and engaged with the rod, wherein the plugs move inwardly into the tube as axial compressive pressure is applied to the plugs so that the axial forces are partially applied as radial pressure to the tube by the rod of filling material as the rod expands radially under the compressive stress applied to it;
(b) a first end plate mounted to the end plugs at the first ends of the plurality of struts; and
(c) a second end plate mounted to the end plugs at the second ends of the plurality of struts;
wherein compressive forces applied to the end plates are distributed to and carried by each of the plurality of struts.

11. The strut unit of claim 10 wherein the filling material has a relatively low Young's modulus and a relatively high Poisson's ratio.

12. The strut unit of claim 10 wherein the tube of each strut is comprised of a composite material having fibers embedded in a solid matrix material, the fibers being disposed circumferentially about the axis of the strut.

13. The strut unit of claim 12 wherein the tube of each strut is formed of a composite of glass fiber in an epoxy matrix.

14. The strut unit of claim 10 wherein the plugs are formed of aluminum.

15. The strut unit of claim 10 wherein the tube of each strut is a composite of fibers in a solid matrix, some of the fibers oriented in an axial direction and some oriented in a circumferential direction.

16. The strut unit of claim 10 further including a plurality of stiffening rings engaged around the outside of the tube of each strut, the rings being axially separated from each other.

17. The strut unit of claim 10 wherein the stiffening rings are comprised of a glass fiber composite or metal.

18. The strut of claim 10 further including a lubricant between the rod and the bore wall of the tube of each strut to facilitate sliding of the rod with respect to the tube.

19. A strut for cryogenic support applications, the strut comprising:
(a) a cylindrical tube comprised of a matrix of material reinforced by circumferential fibers embedded in the matrix, the tube having a cylindrical inner bore wall defining a cavity about a central axis;
(b) a rod of solid filling material having a relatively high Poisson's ratio and a relatively low Young's modulus disposed within the tube cavity of the tube to engage the inner bore wall and having a low thermal conductivity, and wherein the tube has a Young's modulus in the circumferential direction higher than the Young's modulus of the filling material, so that as the rod is compressed, the strain in the rod results in the expansion of the rod outwardly, which expansion is resisted by the tube; and
(c) a plug slidably mounted partially into the cavity at a first end of the tube and engaged with the rod.

20. The strut of claim 19 wherein the tube is formed of a composite of glass fiber in an epoxy matrix.

21. The strut of claim 19 wherein the plugs are formed of aluminum.

22. The strut of claim 19 wherein the tube further includes some fibers oriented in an axial direction embedded in the solid matrix.

23. The strut of claim 19 further including a plurality of stiffening rings engaged around the outside of the tube, the rings being axially separated from each other.

24. The strut of claim 23 wherein the stiffening rings are comprised of a glass fiber composite or metal.

25. The strut of claim 19 further including a lubricant between the rod and the bore wall of the tube to facilitate sliding of the rod with respect to the tube.

26. A strut for use in cryogenic support applications comprising:
(a) a cylindrical tube having a cylindrical internal bore wall defining a cavity about a central axis;
(b) a rod of filling material which is solid at cryogenic temperatures disposed within the cavity of the tube to engage the internal bore wall and having a low thermal conductivity, wherein the tube has a Young's modulus in the circumferential direction higher than the Young's modulus of the filling material so that as the rod is compressed, the strain in the rod results in the expansion of the rod outwardly, which expansion is resisted by the tube; and
(c) means at each end of the tube and rod for engaging the ends of the rod to transmit axial compressive pressure thereto so that the axial forces are partially applied as radial pressure to the tube by the rod of filling material as the rod expands radially under the compressive stress applied to it.

27. The strut of claim 26 wherein the filling material has a relatively low Young's modulus and a relatively high Poisson's ratio.

28. The strut of claim 26 wherein the tube is comprised of a composite material having fibers embedded in a solid matrix material, at least some of the fibers being disposed circumferentially about the axis.

29. The strut of claim 28 wherein the tube is formed of a composite of glass fiber in an epoxy matrix.

30. The strut of claim 28 further including a plurality of stiffening rings engaged around the outside of the tube, the rings being axially separated from each other.

31. The strut of claim 26 wherein the means for engaging comprise a first plug slidably mounted partially into the cavity at a first end of the tube and engaged with the rod and a second plug mounted partially into the cavity at a second end of the tube and engaged with the rod.

32. The strut of claim 26 wherein the means for engaging comprise end caps at each end of the tube and rod, each end cap having a flat central plate engaging the end of the rod and a cylindrical skirt engaging an outer surface of the tube.

* * * * *